US012770955B2

(12) United States Patent
Lee et al.

(10) Patent No.: US 12,770,955 B2
(45) Date of Patent: Oct. 20, 2026

(54) BATTERY DEVICE

(71) Applicant: SK On Co., Ltd., Seoul (KR)

(72) Inventors: Seung Hun Lee, Daejeon (KR); Tak Kyung Yoo, Daejeon (KR); Yang Kyu Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 911 days.

(21) Appl. No.: 18/173,059

(22) Filed: Feb. 23, 2023

(65) Prior Publication Data

US 2023/0282903 A1 Sep. 7, 2023

(30) Foreign Application Priority Data

Mar. 4, 2022 (KR) ........................ 10-2022-0028152
Dec. 19, 2022 (KR) ........................ 10-2022-0178610

(51) Int. Cl.

*H01M 10/6554* (2014.01)
*H01M 10/613* (2014.01)
*H01M 10/6551* (2014.01)
*H01M 10/6556* (2014.01)
*H01M 50/204* (2021.01)

(52) U.S. Cl.

CPC ..... *H01M 10/6554* (2015.04); *H01M 10/613* (2015.04); *H01M 10/6551* (2015.04); *H01M 10/6556* (2015.04); *H01M 50/204* (2021.01)

(58) Field of Classification Search

CPC ........... H01M 10/6554; H01M 10/613; H01M 10/6551; H01M 10/6556; H01M 50/204; H01M 10/658; H01M 50/293; Y02E 60/10

See application file for complete search history.

(56) References Cited

U.S. PATENT DOCUMENTS

2016/0079637 A1* 3/2016 Nemesh ............ H01M 10/6569 429/62
2022/0037726 A1* 2/2022 Choi .................... H01M 50/211
2022/0115737 A1* 4/2022 Shin .................. H01M 10/6555
2023/0015836 A1* 1/2023 Hantschel ........... H01M 50/209

FOREIGN PATENT DOCUMENTS

CN 113422139 A 9/2021
CN 215342831 U 12/2021
CN 216085026 U 3/2022
KR 10-2021-0133530 A 11/2021

OTHER PUBLICATIONS

Extended European Search Report on the European Patent Application No. 23159819.4 issued by the European Patent Office on Jul. 3, 2023.

* cited by examiner

*Primary Examiner* — Muhammad S Siddiquee
(74) *Attorney, Agent, or Firm* — IP&T GROUP LLP

(57) ABSTRACT

A battery device includes a plurality of cell assemblies each including a plurality of battery cells; a housing including an accommodation space in which the plurality of cell assemblies are accommodated; and a cooling plate installed in the housing to cool the plurality of cell assemblies, wherein the cooling plate includes a plurality of seating portions on which the cell assemblies are seated, respectively, and a heat transfer delay portion disposed between the plurality of seating portions and preventing or reducing heat transfer between the seating portions adjacent to each other.

19 Claims, 10 Drawing Sheets

BATTERY DEVICE

CROSS-REFERENCE TO RELATED APPLICATIONS

This patent document claims the priority and benefits of Korean Patent Application No. 10-2022-0028152 filed on Mar. 4, 2022 and Korean Patent Application No. 10-2022-0178610 filed on Dec. 19, 2022 in the Korean Intellectual Property Office, the disclosures of which are incorporated herein by reference in their entirety.

TECHNICAL FIELD

The present disclosure relates to a battery device.

BACKGROUND

A secondary battery may be charged and discharged differently from a primary battery, and may be applied to various fields such as a digital camera, a mobile phone, a laptop computer, a hybrid vehicle, and an electric vehicle. A secondary battery may include a lithium secondary battery, a nickel-cadmium battery, a nickel-metal hydride battery, and a nickel-hydrogen battery.

Such a secondary battery may be manufactured as a flexible pouch-type battery cell or a rigid prismatic or cylindrical can-type battery cell, and a plurality of battery cells may be electrically connected to each other. In this case, the plurality of cells may form a cell assembly and may be disposed in the housing, and at least one cell assembly may be included in a battery device such as a battery module or a battery pack.

When a battery cell reaches an end of lifespan, when swelling occurs in a battery cell, when various events occur such as when a battery cell is overcharged, when a battery cell is exposed to heat, or when a sharp object such as a nail penetrates through a casing (exterior material) of a battery cell, when external impacts are applied to a battery cell, a battery cell may be ignited. Flames or high-temperature gas ejected from a battery cell may cause chain ignition of adjacent other battery cells accommodated in a battery device.

To address the above issue, a cooling structure for cooling heat generated from a battery cell has been used. For example, a general technique of installing a plurality of cell assemblies including a plurality of battery cells and cooling the plurality of cell assemblies through a cooling plate (heat sink) has been suggested.

However, in the case of the general technique, heat generated in a portion of the cell assembly in which the event occurred may be transferred to the battery cells of another cell assembly adjacent to the cell assembly in which the event occurred, such that thermal runaway may occur.

SUMMARY

An aspect of the present disclosure is to provide a battery device which may reduce the effect of high-temperature heat generated from battery cells provided in a portion of cell assemblies on other adjacent cell assemblies when an event occurs in the portion of cell assemblies.

An aspect of the present disclosure is to provide a battery device which may reduce the effect of high-temperature gas or flames generated in a portion of cell assemblies on other cell assemblies.

An aspect of the present disclosure is to provide a battery device which may delay or reduce secondary ignition and/or thermal runaway of battery cells.

According to an aspect of the present disclosure, a battery device includes a plurality of cell assemblies each including a plurality of battery cells; a housing including an accommodation space in which the plurality of cell assemblies are accommodated; and a cooling plate installed in the housing to cool the plurality of cell assemblies, wherein the cooling plate includes a plurality of seating portions on which the cell assemblies are seated, respectively, and a heat transfer delay portion disposed between the plurality of seating portions and preventing or reducing heat transfer between the seating portions adjacent to each other.

The heat transfer delay portion may be disposed in a direction intersecting a region between the plurality of seating portions adjacent to each other.

A width of the heat transfer delay portion disposed between seating portions adjacent to each other may have a value of ½ or more of an opposing width of the seating portions adjacent to each other.

The cooling plate may include a cooling passage through which a refrigerant may flow, and the heat transfer delay portion may be disposed in a region of the cooling plate in which the cooling passage is not disposed.

The heat transfer delay portion may include at least one opening formed in the cooling plate.

The heat transfer delay portion may further include a filler filled in the opening to block heat transfer.

The filler may include at least one of mica, silica, kaolin, silicate, graphite, alumina, ceramic wool, and aerogel.

The cooling plate may include a first plate opposing the cell assembly and a second plate coupled to the first plate on an opposite side opposing the cell assembly, and the cooling passage may be formed between the first plate and the second plate.

The opening may be formed on one of the first plate and the second plate, and the other of the first plate and the second plate may have a shape covering the opening. The opening is formed by penetrating through the first plate and the second plate.

The housing may include a first housing forming the accommodation space and a second housing disposed on an upper side of the first housing to cover an upper portion of the accommodation space, and the cooling plate may be disposed on a lower side of the first housing to cover a lower portion of the accommodation space.

The first housing may include a sidewall forming an edge of the housing and a partition wall intersecting the accommodation space to divide the accommodation space into a plurality of spaces in which the cell assemblies are accommodated, respectively, and the sidewall and the partition wall may be fastened to the cooling plate.

The cooling plate may include a fastening portion fastened to the partition wall, and the heat transfer delay portion may have a shape disconnected from a region in which the fastening portion is formed.

The cell assembly may include a casing in which the plurality of battery cells are accommodated, the casing may be configured to cover the plurality of battery cells in a state in which at least a portion of the lower surfaces of the plurality of battery cells is exposed, and the cooling plate may be configured to cover lower surfaces of the plurality of battery cells to cool the plurality of battery cells.

A heat transfer member transferring heat generated from the plurality of battery cells to the cooling plate may be disposed between a lower surface of the plurality of battery cells and an upper surface of the cooling plate.

The cell assembly may include a casing in which a plurality of battery cells are accommodated, and the casing may have a gas outlet formed in a portion opposing an electrode terminal of the battery cell.

The housing may include a plurality of sidewalls forming an edge of the housing to form the accommodation space, and at least one of the plurality of sidewalls includes a first communication hole formed in a portion opposing the gas outlet, and a first gas channel formed in the at least one sidewall to be connected to the first communication hole.

The housing may include a plurality of partition walls intersecting the accommodation space to divide the accommodation space into a plurality of spaces in which the cell assemblies are accommodated, respectively, and at least one of the plurality of partition walls may include a second communication hole formed in a portion opposite to the gas outlet, and a second gas channel formed in the at least one partition wall to be connected to the second communication hole.

At least one of the plurality of partition walls may include a blocking plate partitioning the second gas channel in a length direction, and the blocking plate may partition a region through which gas generated from a cell assembly disposed on a first side of each partition wall flows, and a region in which gas generated from the cell assembly disposed on a second side opposite to the first side flows.

According to an aspect of the present disclosure, a battery device includes a plurality of cell assemblies each including a plurality of battery cells; a housing including sidewalls forming an accommodation space in which the plurality of cell assemblies are accommodated, and a plurality of partition walls intersecting the accommodation space to divide the accommodation space into a plurality of spaces in which the cell assemblies are accommodated, respectively; and a cooling plate covering a lower portion of the accommodation space and fixed to the sidewall and the partition wall to cool the plurality of cell assemblies, wherein the plurality of cell assembly includes a casing configured to cover the plurality of battery cells in a state in which at least a portion of lower surfaces of the plurality of battery cells are exposed, and wherein the cooling plate includes a plurality of seating portions on which lower surfaces of the cell assemblies are seated, respectively, and a heat transfer delay portion disposed below the partition wall and preventing or reducing heat transfer between the seating portions adjacent to each other.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
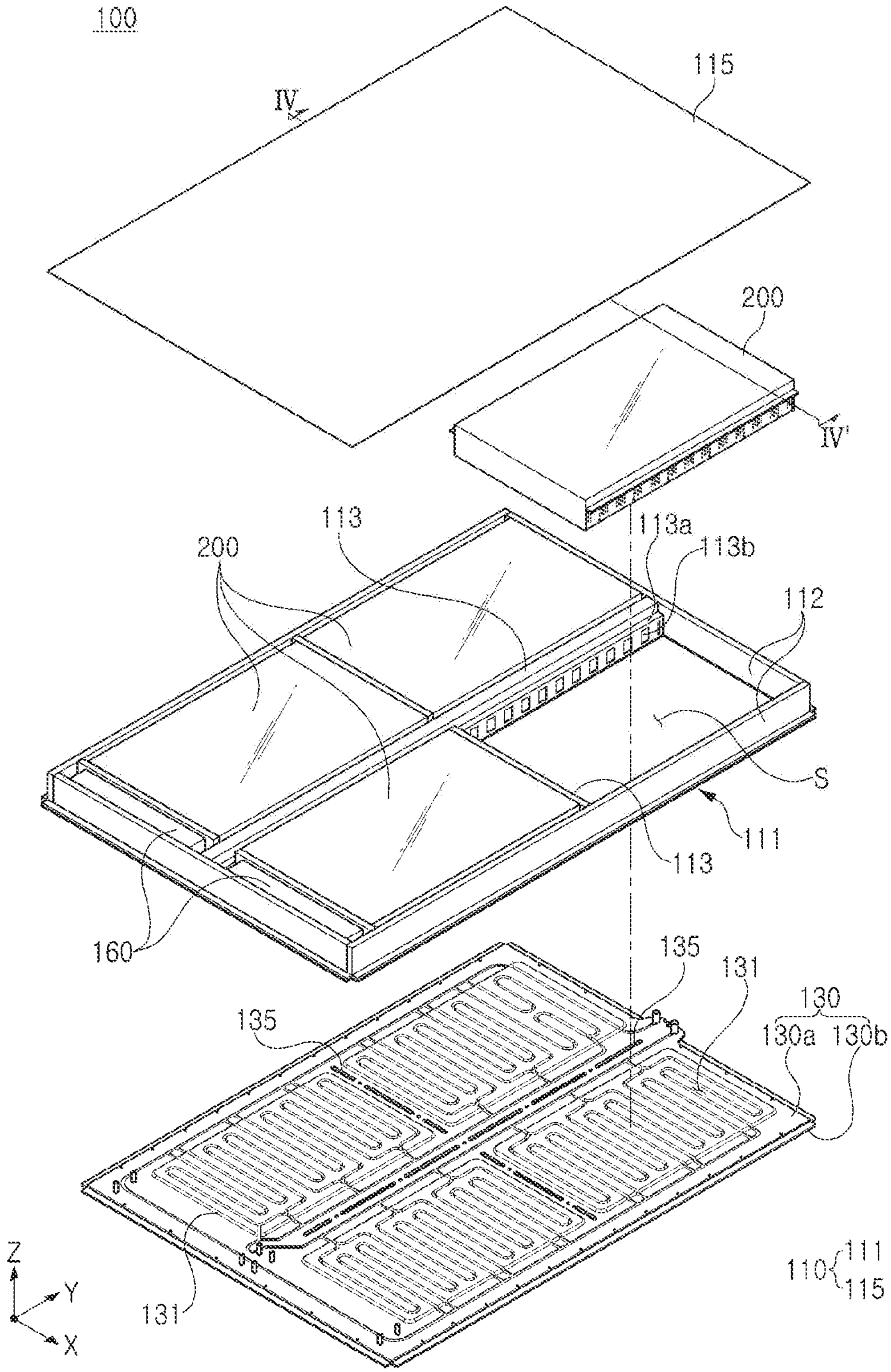
FIG. 1 is an exploded perspective diagram illustrating a battery device according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description. Also, elements having the same function within the scope of the same concept represented in the drawing of each example embodiment will be described using the same reference numeral.

In the drawings, same elements will be indicated by same reference numerals. Overlapping descriptions and detailed descriptions of generally used functions and elements which may unnecessarily make the gist of the present disclosure obscure will not be provided. In the accompanying drawings, a portion of elements may be exaggerated, omitted or briefly illustrated, and the sizes of the elements may not necessarily reflect the actual sizes of these elements.

In the example embodiment, in the battery device 100, at least one cell assembly including a plurality of battery cells may be installed in a housing. In the example embodiment, the battery device 100 may include a battery module or a battery pack in which at least one cell assembly is installed, and a battery pack having a cell-to-pack structure in which at least one cell assembly is installed directly in a housing without using battery modules.

FIG. 1 is an exploded perspective diagram illustrating a battery device 100 according to an example embodiment.

Referring to FIG. 1, a battery device 100 in the example embodiment may include a plurality of cell assemblies 200, a housing 110, and a cooling plate 130.

Each of the plurality cell assemblies 200 may include a plurality of battery cells (210 in FIG. 2), and may have a shape in which the plurality of battery cells 210 are grouped. An example configuration of the cell assembly 200 will be described later with reference to FIG. 2.

The housing 110 may include an accommodation space S in which the plurality of cell assemblies 200 are accommodated. The housing 110 may include a first housing 111 and a second housing 115. The first housing 111 may form an accommodation space S in which the plurality of cell assemblies 200 are accommodated. The second housing 115 may be disposed above the first housing 111 to cover the upper portion of the accommodation space S. The first housing 111 and the second housing 115 may be coupled to each other through a generally used coupling means such as bolt fastening or welding.

The housing 110 may include a material having high thermal conductivity such as metal. For example, at least one of the first housing 111 and the second housing 115 may include aluminum or steel. However, the material of the housing 110 is not limited to metal, and the material may be varied as long as the material has similar strength and thermal conductivity.

The first housing 111 may include a plurality of sidewalls 112 forming an edge of the housing 110 to form the accommodation space S, and a plurality of partition walls 113 intersecting the accommodation space S to divide the accommodation space S into spaces in which the cell assemblies 200 are accommodated, respectively. When the first housing 111 has a rectangular cross-section, the first housing 111 may include four sidewalls 112. When four cell assemblies 200 are accommodated in the accommodation space S, the partition wall 113 may partition the accommodation space S into four spaces. The partition wall 113 may have a shape intersecting the accommodation space S in the first axis X direction and the second axis Y direction. The partition wall 113 and the sidewall 112 may be fastened to the cooling plate 130.

The partition wall 113 may include a second communication hole **113*b* such that high-temperature gas or flame generated in the cell assembly 200 may flow into the partition wall 113 while an event occurs and may flow therein. The partition wall 113 may include a support surface 113*a* supporting the cell assembly 200. An extension portion (257 in FIG. 2) provided in the casing 250 of the cell assembly 200 may be fastened to the support surface 113*a***.

The cooling plate 130 may be installed in the housing 110 to cool heat generated from the plurality of cell assemblies 200. When four cell assemblies 200 are disposed in the accommodation space S of the housing 110, the cooling plate 130 may be disposed to cool the four cell assemblies 200.

The cooling plate 130 may have a structure in which a refrigerant may flow. The cooling plate 130 may include an inlet (141 in FIG. 5) for supplying the refrigerant to the cooling plate 130 such that the refrigerant may flow therein, and an outlet (143 in FIG. 5) through which the refrigerant is discharged from the cooling plate 130. In example embodiments, a refrigerant (cooling medium) may be defined as a fluid used for cooling and may include gas and also liquid such as cooling water.

The cooling plate 130 may include a first plate **130*a* and a second plate 130*b* to form a passage through which a refrigerant may flow. The first plate 130*a* may be disposed to oppose the cell assembly 200, and the second plate 130*b* may be coupled to the first plate 130*a* on an opposite side opposing the cell assembly 200. The cooling plate 130** may include a metal material having high thermal conductivity, such as aluminum, but the material is not limited thereto.

The cooling plate 130 may include a plurality of seating portions 131 on which the cell assemblies 200 are seated, respectively and a heat transfer delay portion 135 disposed between the plurality of seating portions 131. The heat transfer delay portion 135 may hinder heat transfer between the seating portions 131 adjacent to each other. When four cell assemblies 200 are disposed, the cooling plate 130 may include four seating portions 131, and the heat transfer delay portion 135 may have a shape crossing the first axis X direction and the second axis Y direction to be disposed between the four seating portions 131.

In the housing 110, an electric component 160 such as a battery management system (BMS) may be disposed. The battery management system may be electrically connected to the cell assembly 200, may check an operation status of the cell assembly 200 and may control operation of the cell assembly 200.

In the description below, an example of the cell assembly 200 provided in the example embodiment will be described with reference to FIGS. 2 to 4.

Figure 2:
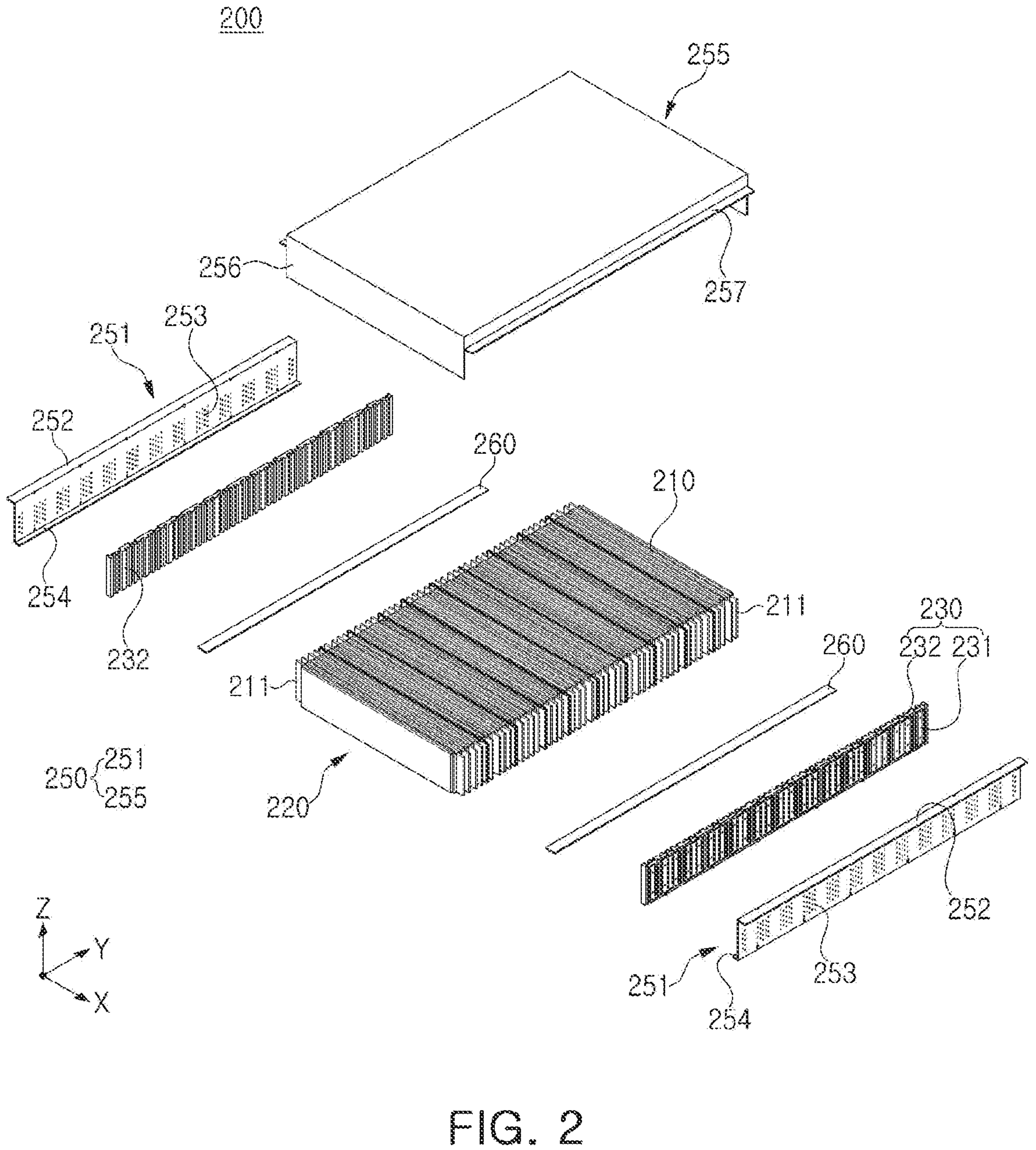
FIG. 2 is an exploded perspective diagram illustrating a cell assembly illustrated in FIG. 1.

FIG. 2 is an exploded perspective diagram illustrating a cell assembly 200 illustrated in FIG. 1. FIG. 3 is a perspective diagram illustrating a lower surface of a cell assembly 200 illustrated in FIG. 2. FIG. 4 is a cross-sectional diagram taken along line I-I' in FIG. 3. FIG. 4 does not illustrate the busbar assembly 230.

The cell assembly 200 may include a plurality of battery cells 210. The battery cell 210 may be configured as a secondary battery. For example, the battery cell 210 may include a lithium secondary battery, a nickel-cadmium battery, a nickel-metal hydride battery, a nickel-hydrogen battery, and the like.

The battery cell 210 may include a pouch-type secondary battery. The battery cell 210 may include an exterior material (casing) in which the electrode assembly and the electrolyte are accommodated, and a plurality of electrode terminals (electrode lead) 211 exposed to the outside of the exterior material. The electrode assembly may have a plurality of electrode plates and electrode tabs and may be accommodated in the exterior material. The electrode plate may include a positive electrode plate and a negative electrode plate. The electrode assembly may be stacked in a state in which wide surfaces of the positive electrode plate and the negative electrode plate oppose each other. The positive electrode plate and the negative electrode plate may be stacked with a separator interposed therebetween. An electrode tab may be provided on each of the plurality of positive electrode plates and the plurality of negative electrode plates. The electrode tabs may be connected to an electrode terminal (electrode lead) 211 such that the same polarities may be in contact with each other. The electrode terminal 211 may include a positive electrode terminal and a negative electrode terminal. A positive electrode terminal and a negative electrode terminal may be provided on both ends of the exterior material, respectively. However, the arrangement position of the electrode terminals 211 or the number of electrode terminals 211 are not limited thereto and may be varied.

A pouch-type secondary battery has been described as an example of the battery cell 210, but the battery cell 210 in the example embodiment is not limited thereto and may include a prismatic secondary battery or a cylindrical secondary battery. Also, in the example embodiment, the battery cell 210 may have a configuration in which a plurality of pouch-type secondary batteries are formed in a bundle.

A plurality of battery cells 210 may be stacked using an adhesive means such as double-sided tape and may form the cell stack 220.

A plurality of battery cells 210 may be accommodated in a casing 250. The casing 250 may accommodate the plurality of battery cells 210 in a stacked state. The casing 250 may include a first cover 251, a second cover 255, and a side portion 256. The first cover 251 may be disposed on a side surface of the cell stack 220 opposing the electrode terminal 211. The second cover 255 may cover the upper surface of the cell stack 220. The side portion 256 may cover a side surface of the cell stack 220 on which the electrode terminal 211 is not disposed. In FIG. 2, the second cover 255 and the side portion 256 may be integrally formed, but the side portion 256 may be manufactured separately from the second cover 255, and may be fixed to the second cover 255 while being coupled to the cell stack 220.

A busbar assembly 230 may be disposed between the first cover 251 and the cell stack 220. The busbar assembly 230 may include a busbar 231 which may be electrically conductive and may be electrically connected to the electrode terminal 211 of the battery cell 210 and a support plate 232 which may be electrically insulated.

Figure 3:
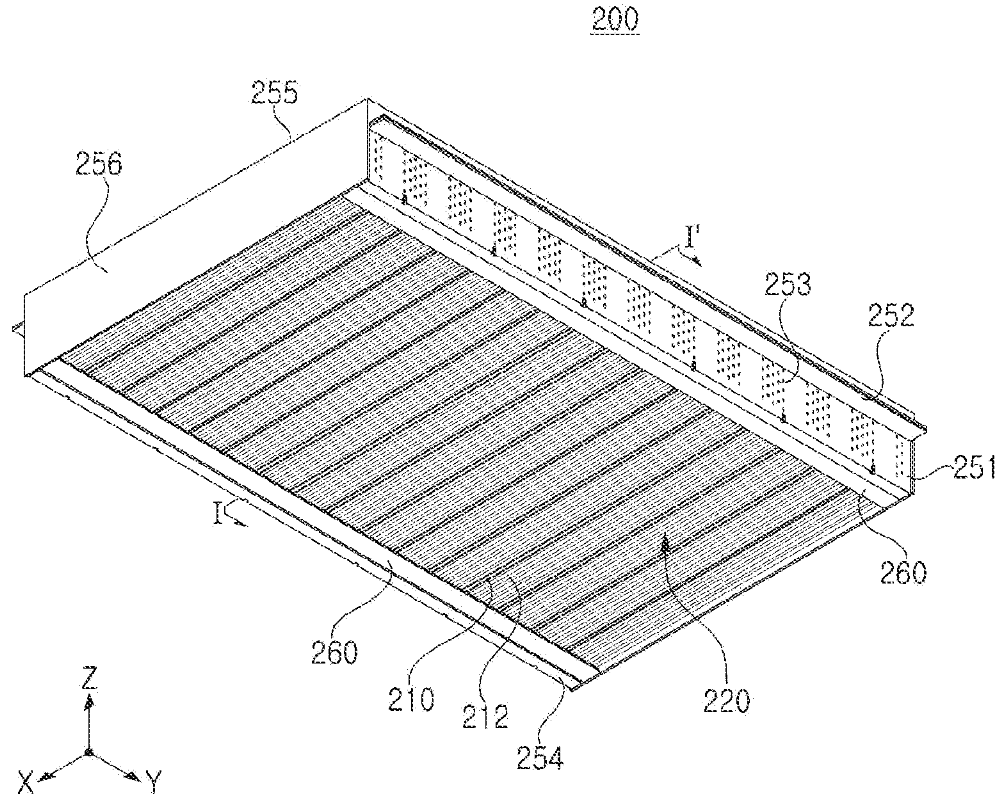
FIG. 3 is a perspective diagram illustrating a lower surface of a cell assembly illustrated in FIG. 2.
Figure 4:
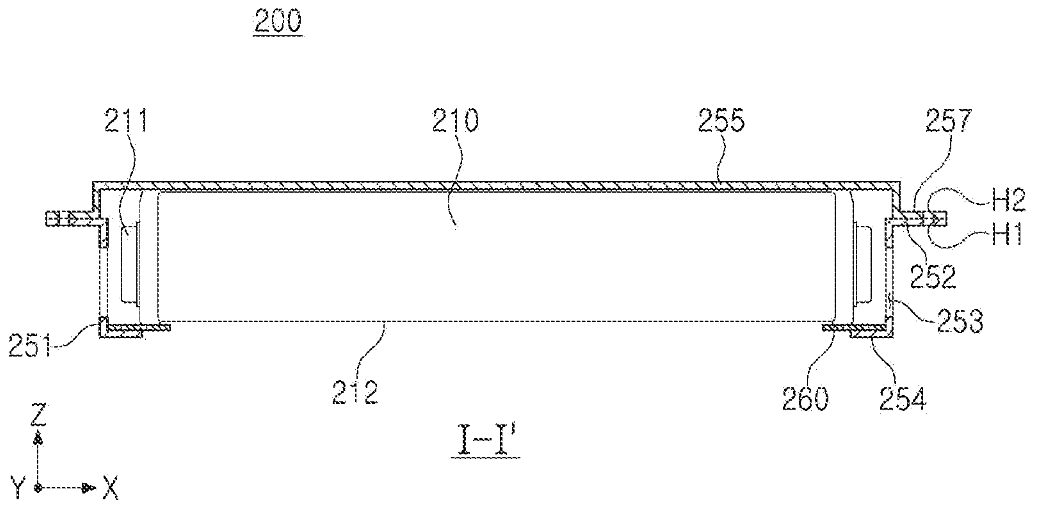
FIG. 4 is a cross-sectional diagram taken along line I-I' in FIG. 3.

As illustrated in FIGS. 3 and 4, the casing 250 may be configured to cover the plurality of battery cells 210 in a state in which at least a portion of the lower surfaces 212 of the plurality of battery cells 210 are exposed. That is, at least a portion of the lower surfaces 212 of the plurality of battery cells 210 may not be covered by the casing 250. Accordingly, the lower surfaces 212 of the plurality of battery cells 210 may directly exchange heat with the cooling plate 130 or may exchange heat with the cooling plate 130 through a heat transfer member (150 in FIG. 11). Accordingly, in the example embodiment, as compared to the prior art in which the lower surfaces 212 of the plurality of battery cells 210 are covered by a casing, the heat transfer path may be simplified such that the heat exchange efficiency may be increased. Also, in the example embodiment, the number of components of the casing may be reduced as compared to the prior art, which may be advantageous.

The casing 250 may include a gas outlet 253 in a portion opposite to the electrode terminal 211 of the battery cell 210 to discharge high-temperature gas or flame discharged from the battery cell 210 to the outside of the casing 250. The gas outlet 253 may be formed on the first cover 251.

The second cover 255 may include an extension portion 257 seated on the support surface (113*a* in FIG. 1) of the partition wall 113 such that the second cover 255 may be supported on the support surface (113*a* in FIG. 1) of the partition wall 113. The extension portion 257 of the second cover 255 may be fastened to the support surface (113*a* in FIG. 1) of the partition wall 113 through the fastening portion H2, and accordingly, the cell assembly 200 may be supported by the partition wall 113. The first cover 251 may include an external extension portion 252 corresponding to the extension portion 257 of the second cover 255. When the external extension portion 252 is provided on the first cover 251, the extension portion 257 and the external extension portion 252 may be fastened to the support surface (113*a* in FIG. 1) through the fastening portions H1 and H2 in a state in which the extension portion 257 and the external extension portion 252 are in contact with each other. However, the external extension portion 252 is not formed on the first cover 251, and the external extension portion 252 may be fastened to the support surface (113*a* in FIG. 1) of the partition wall 113 through only the extension portion 257 of the second cover 255.

The first cover 251 may include an inner extension portion 254 extending in an inward direction of the casing 250 to cover a portion of the lower surfaces 212 of the plurality of battery cells 210. The inner extension portion 254 may support a portion of the lower surface 212 of the plurality of battery cells 210 or a lower surface of the busbar assembly 230. Also, to prevent the plurality of battery cells 210 from being separated from the casing 250, a support member 260 may be disposed on a lower portion of the plurality of battery cells 210. However, the support member 260 may also be integrally formed with the inner extension portion 254.

The configuration of the cell assembly 200 illustrated in FIGS. 2 to 4 is merely an example, and the type of battery cell 210 and the shape or coupling structure of the casing 250 may be varied.

Figure 5:
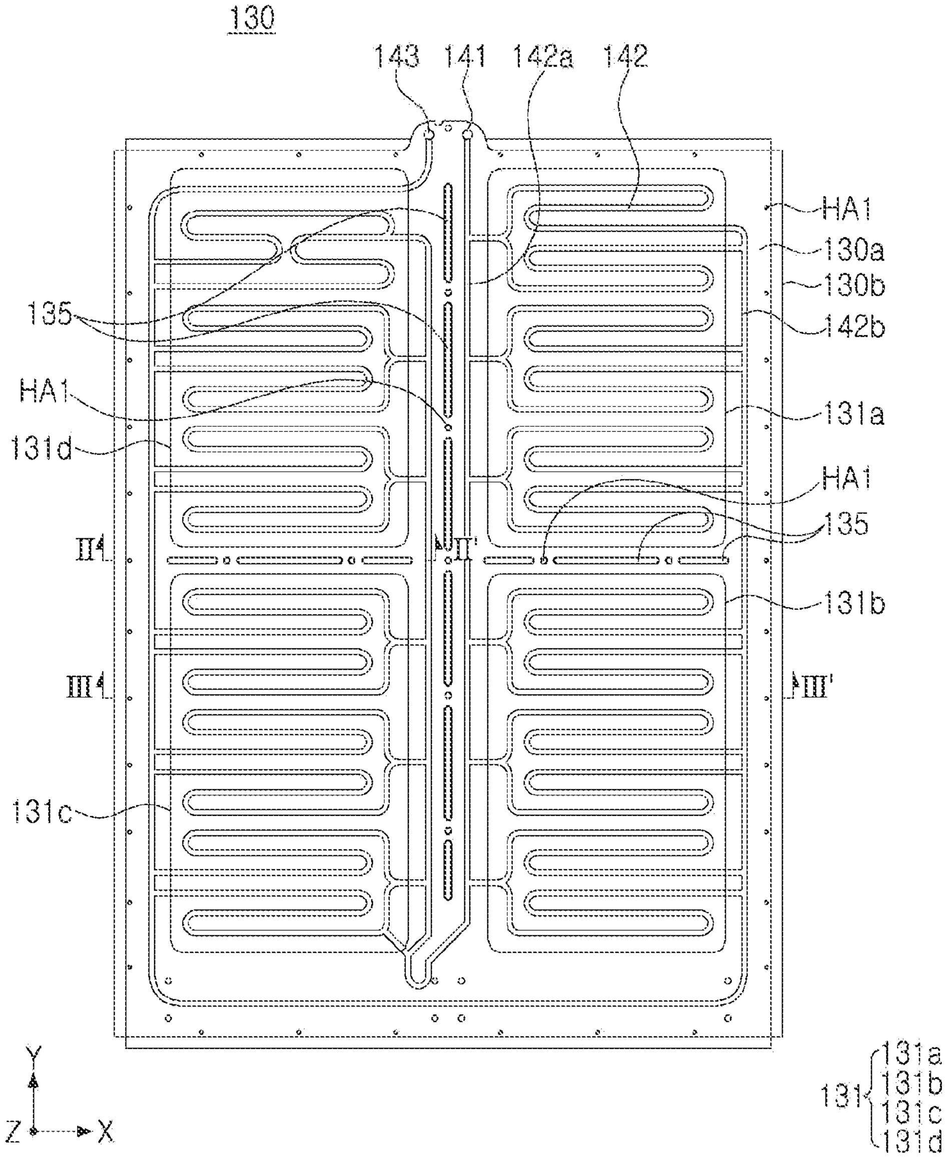
FIG. 5 is a plan diagram illustrating a cooling plate according to an example embodiment of the present disclosure.
Figure 6:
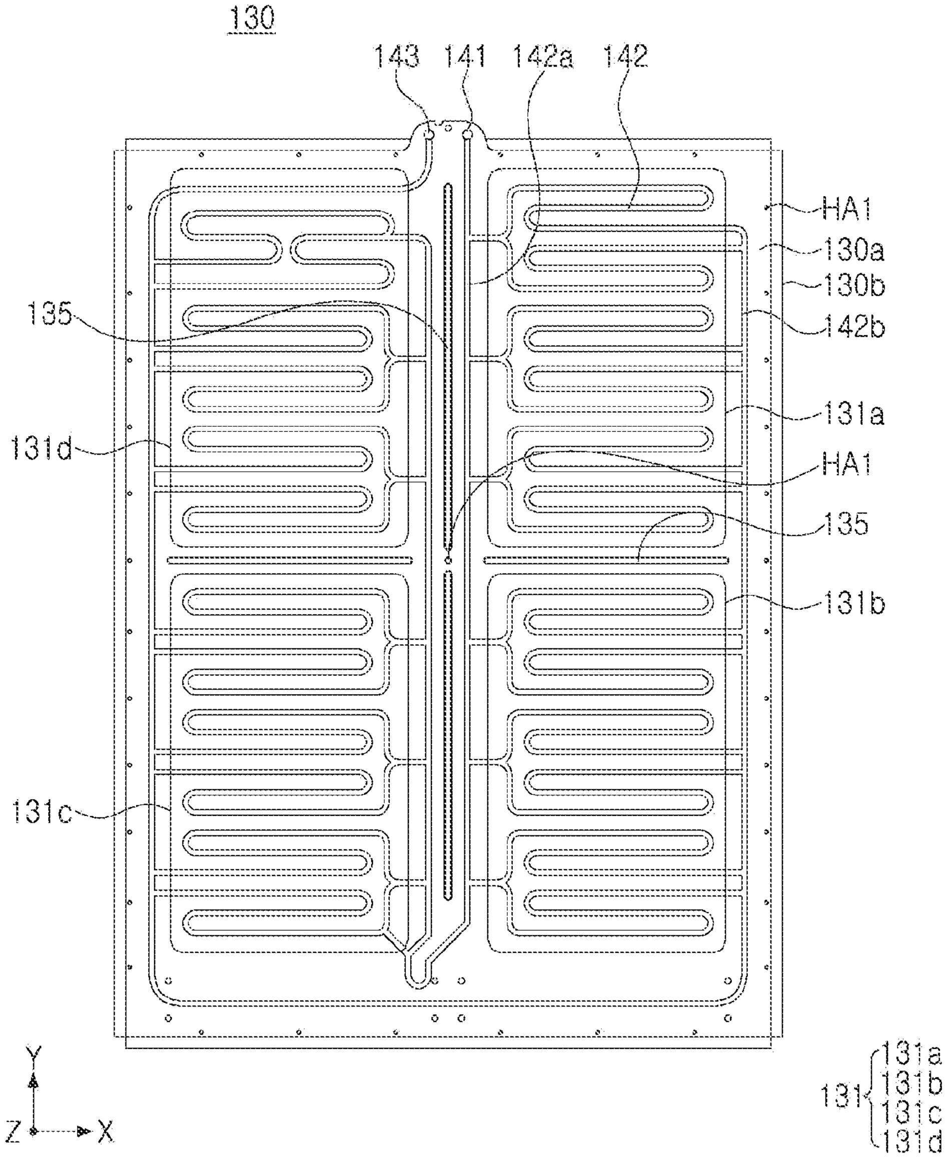
FIG. 6 is a plan diagram illustrating a modified example of the cooling plate illustrated in FIG. 5.

FIG. 5 is a plan diagram illustrating a cooling plate 130 according to an example embodiment. FIG. 6 is a plan diagram illustrating a modified example of the cooling plate 130 illustrated in FIG. 5.

Referring to FIGS. 5 and 6, the cooling plate 130 may include a cooling passage 142 through which a refrigerant may flow such that the refrigerant may flow therein. The cooling passage 142 may be connected to an inlet 141 for supplying refrigerant to the cooling plate 130 and an outlet 143 through which refrigerant is discharged from the cooling plate 130. The cooling passage 142 may be formed between the first plate 130*a* and the second plate 130*b*.

The cooling plate 130 may include a heat transfer delay portion 135 disposed between the plurality of seating portions 131 on which the cell assemblies (200 in FIG. 1) are seated, respectively, and a plurality of seating portions 131 and interfering with heat transfer between the seating portions 131 adjacent to each other. When four cell assemblies 200 are disposed, the seating portion 131 may include a first seating portion 131*a*, a second seating portion 131*b*, a third seating portion 131*c*, and a fourth seating portion 131*d* to correspond to the cell assemblies (200 in FIG. 1), respectively.

A cooling passage 142 may be disposed in each of the seating portions 131*a*, 131*b*, 131*c*, and 131*d*. The cooling passage 142 may include a branch passage 142*a* for supplying a refrigerant from the inlet 141 to each of the seating portions 131*a*, 131*b*, 131*c*, and 131*d*. Also, the cooling passage 142 may include a confluence passage 142*b* such that the refrigerant discharged from the seating portions 131*a*, 131*b*, 131*c*, and 131*d* may flow toward the outlet 143. By forming the cooling passage 142 for supplying the refrigerant to each of the seating portions 131*a*, 131*b*, 131*c*, and 131*d* as described above, the seating portions 131*a*, 131*b*, 131*c*, and 131*d* may be uniformly cooled.

The seating portions 131*a*, 131*b*, 131*c*, and 131*d* may be partitioned by the heat transfer delay portion 135, such that heat transfer between the seating portions 131*a*, 131*b*, 131*c*, and 131*d* adjacent to each other may be hindered. The heat transfer delay portion 135 may have a shape intersecting in the first axis X direction and the second axis Y direction so as to be disposed between the four seating portions 131. That is, the heat transfer delay portion 135 may be disposed in a direction intersecting a region between the plurality of seating portions 131 adjacent to each other. The heat transfer delay portion 135 may have a shape extending linearly with respect to each of the first axis X direction and the second axis Y direction.

The heat transfer delay portion 135 may have a relatively long length to sufficiently delay heat transfer between the seating portions 131 adjacent to each other. The width of the heat transfer delay portion 135 disposed between the seating portions 131 adjacent to each other may have a value equal to or greater than ½ of the width of the opposing seating portions 131 adjacent to each other. For example, the width of the heat transfer delay portion 135 disposed in the first axis X direction may have a value of ½ or more of the width of the seating portions 131*a*, 131*b*, 131*c*, and 131*d*, adjacent to each other, in the first axis X direction. Also, the width of the heat transfer delay portion 135 disposed in the second axis Y direction may have a value of ½ or more of the width of the seating portions 131*a*, 131*b*, 131*c*, and 131*d*, adjacent to each other, in the second axis Y direction. Here, the width of each seating portion 131 may be defined as the width of a portion of the upper surfaces of the cooling plate 130 corresponding to the lower surface (212 in FIG. 3) of the battery cell 210.

The heat transfer delay portion 135 may be disposed in a region of the cooling plate 130 in which the cooling passage 142 is not disposed. The heat transfer delay portion 135 may be formed along a region corresponding to the partition wall (113 in FIG. 1) and may be disposed in a position not overlapping the cooling passage 142. The heat transfer delay portion 135 may include an opening 136 having a slot shape and formed on at least one of the first plate 130*a* and the second plate 130*b*.

The cooling plate 130 may include a fastening portion HA1 fastened to the sidewall 112 and the partition wall 113. The heat transfer delay portion 135 may be disposed below the partition wall 113. The heat transfer delay portion 135 may have a shape disconnected from a region in which a fastening portion HA1 to which the cooling plate 130 and the partition wall 113 are fastened may be formed. That is, the heat transfer delay portion 135 may have a shape extending along a region corresponding to the partition wall 113 and may be formed in a region other than the fastening portion HA1 to which the partition wall 113 is fastened.

The cooling plate 130 in FIG. 5 may include two fastening portions HA1 fastened to the partition wall 113 in the first axis X direction between the first seating portion 131*a* and the second seating portion 131*b*. In this case, the heat transfer delay portion 135 may have a shape disconnected from a region in which the two fastening portions HA1 are formed, and may have a shape extending in a linear line in a region other than the two fastening portions HA1.

The cooling plate 130 in FIG. 6 may not include a fastening portion fastened to the partition wall 113 in the first axis X direction between the first seating portion 131*a* and the second seating portion 131*b*. In this case, the heat transfer delay portion 135 may have a shape extending in a linear line without being disconnected between the first seating portion 131*a* and the second seating portion 131*b*.

As described above, the shape of the heat transfer delay portion 135 and arrangement thereof may be varied depending on the arrangement position of the fastening portions HA1 fastened to the partition wall 113 or the number of the fastening portions HA1.

In the description below, the heat transfer delay portion 135 will be described with reference to FIGS. 7 to 9.

Figure 7:
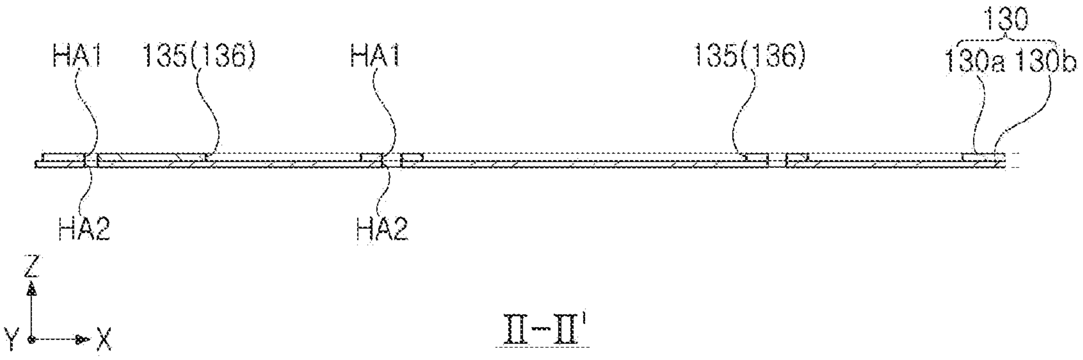
FIG. 7 is a cross-sectional diagram taken along line II-II' in FIG. 5.

FIG. 7 is a cross-sectional diagram taken along line II-II' in FIG. 5. FIG. 8 is a cross-sectional diagram illustrating a modified example taken along line II-II' in FIG. 5. FIG. 9 is a cross-sectional diagram illustrating another modified example taken along line II-II' in FIG. 5.

Referring to FIG. 7, the cooling plate 130 may include a first plate 130*a* and a second plate 130*b*, and the first plate 130*a* and the second plate 130*b* may include fastening portions HA1 and HA2 penetrating the cooling plate 130 to be fastened to the sidewall 112 and the partition wall 113, respectively. That is, the fastening portion HA1 may be formed on the first plate 130*a* such that the sidewall 112 and the partition wall 113 may be fastened by the fastening member (B in FIG. 11), and a fastening portion HA2 may be formed on the second plate 130*b*.

The heat transfer delay portion 135 may include at least one opening 136 formed in the cooling plate 130. The opening 136 may have a slot shape having a relatively long length to efficiently block heat transfer between the seating portions 131 adjacent to each other.

The opening 136 may be formed on at least one of the first plate 130*a* and the second plate 130*b*. That is, when the opening 136 is formed in at least one of the first plate 130*a* and the second plate 130*b*, heat transfer by conduction may be blocked through the portion in which the opening 136 is formed, and heat transfer by conduction may occur only through a region in which the opening 136 is not formed. When the opening 136 is formed in only one of the first plate 130*a* and the second plate 130*b*, as illustrated in FIG. 7, the opening 136 may be formed in the first plate 130*a* opposing the cell assembly 200.

Figure 8:
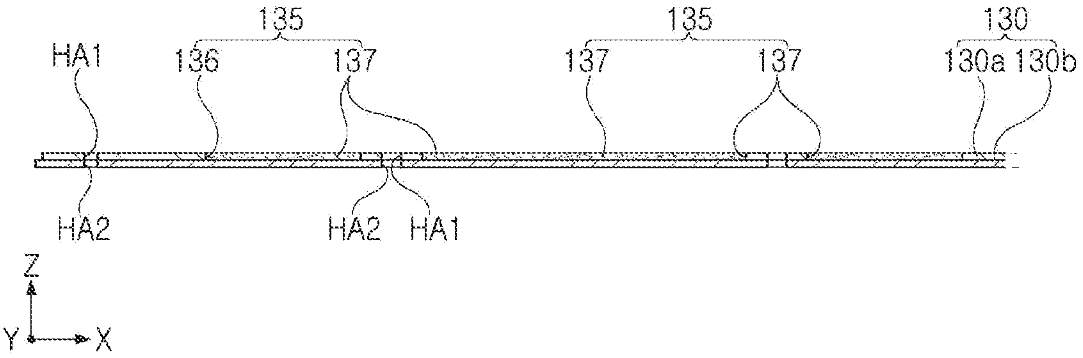
FIG. 8 is a cross-sectional diagram illustrating a modified example taken along line II-II' in FIG. 5.

Referring to FIG. 8, the heat transfer delay portion 135 may further include a filler 137 filled in the opening 136 to delay heat transfer. The example embodiment illustrated in FIG. 8 may be configured the same as the example embodiment illustrated in FIG. 7 other than the filler, and thus, only the filler 137 will be described.

The filler 137 may include a material having at least one of thermal insulation, heat resistance, and flame retardancy to delay heat transfer. Herein, thermal insulation may refer to properties in which thermal conductivity is 1.0 W/mK or less. To secure a higher thermal insulation, thermal conductivity may have a value of 0.5 W/mK or less, or 0.3 W/mK or less. Heat resistance may refer to properties in which a material does not melt and does not change a shape thereof even at a temperature of 300 degrees Celsius or higher. Flame retardancy may refer to properties preventing self-combustion when a fire source is removed, and may refer to, for example, a grade of V-0 or higher in the UL94 V Test.

For example, the filler 137 may include at least one of mica, silica, kaolin, silicate, graphite, alumina, ceramic wool, and aerogel to prevent heat and/or frame from spreading. However, the material of the filler 137 is not limited thereto, and various generally used materials which may prevent high-temperature heat or flame from spreading to other battery cells 210 through the cooling plate 130 in thermal runaway of the battery cell 210 may be used.

Figure 9:
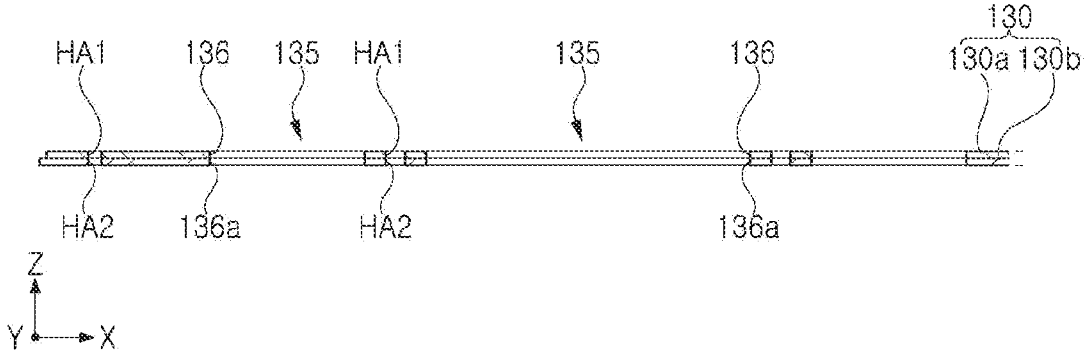
FIG. 9 is a cross-sectional diagram illustrating another modified example taken along line II-II' in FIG. 5.

Referring to FIG. 9, the heat transfer delay portion 135 may include an opening 136 formed in the first plate 130*a* and an opening 136*a* formed in the second plate 130*b*. That is, the openings 136 and 136*a* included in the heat transfer delay portion 135 may be formed by penetrating through the first plate 130*a* and the second plate 130*b*. In this case, the portion in which the heat transfer delay portion 135 is formed may block heat transfer by conduction between the seating portions 131, which may be advantageous.

Even when the openings 136 and 136*a* are formed by penetrating through the first plate 130*a* and the second plate 130*b* as illustrated in FIG. 9, the filler 137 may be filled in the through-shaped openings 136 and 136*a*.

Figure 10:
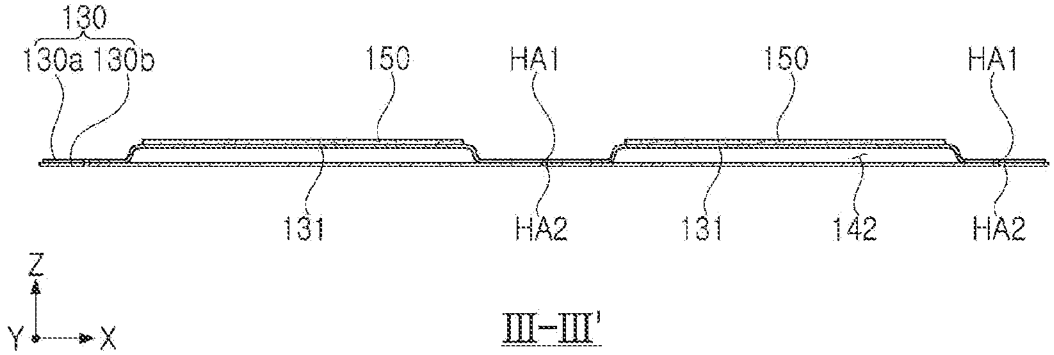
FIG. 10 is a cross-sectional diagram taken along line III-III' in FIG. 5.

FIG. 10 is a cross-sectional diagram taken along line III-III' in FIG. 5.

Referring to FIG. 10, in the cooling plate 130, a cooling passage 142 may be formed between the first plate 130*a* and the second plate 130*b*. A seating portion 131 on which a battery cell (210 in FIG. 3) is seated may be formed on an upper surface of the first plate 130*a*.

A heat transfer member 150 may be interposed between the cell assembly 200 and the cooling plate 130 such that heat may be smoothly transferred from the battery cell 210 of the cell assembly (200 in FIG. 3) to the cooling plate 130.

The heat transfer member 150 may include at least a portion of thermal grease, thermal adhesive, thermally conductive epoxy, and a heat dissipation pad to ensure smooth heat transfer, but an example embodiment thereof is not limited thereto. The heat transfer member 150 may be disposed in the form of a pad between the lower surface (212 in FIG. 3) of the battery cell 210 and the upper surface of the cooling plate 130, or may be formed by applying the member to the upper surface of the cooling plate 130 in a liquid or gel state.

Figure 11:
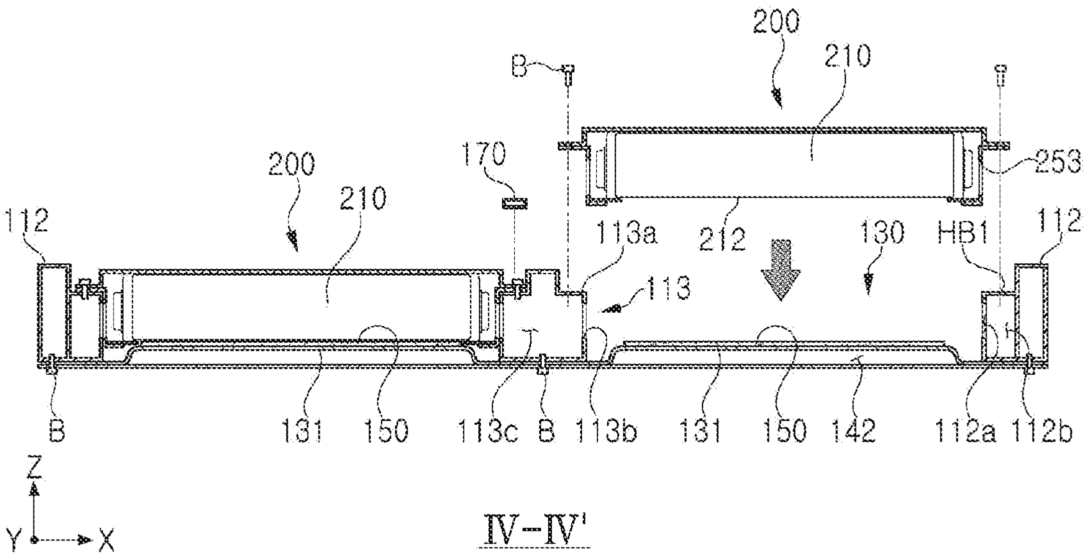
FIG. 11 is a cross-sectional diagram taken along line IV-IV' in FIG. 1.

In the description below, the structure of the battery device 100 according to the example embodiment will be described with reference to FIG. 11. FIG. 11 is a cross-sectional diagram taken along line IV-IV' in FIG. 1. FIG. 11 does not include the second housing 115 illustrated in FIG. 1, and illustrates a state in which the left cell assembly 200 is seated on the seating portion 131 of the cooling plate 130, and the state before the right cell assembly 200 is seated on the seating portion 131 of the cooling plate 130.

The cooling plate 130 may have a structure covering the lower portion of the accommodation space (S in FIG. 1), and the sidewall 112 and the partition wall 113 may be fastened to the cooling plate 130 by a fastening member B such as a bolt. In a state in which the sidewall 112 and the partition wall 113 are coupled to the cooling plate 130, the cell assembly 200 may be seated on the seating portion 131 of the cooling plate 130. The cell assembly 200 may be supported while being fastened to the sidewall 112 and the partition wall 113 by the fastening member B. For example, the cell assembly 200 may be fastened to the fastening portion HB1 by the fastening member B while being disposed on the support surface 113*a* of the partition wall 113 and may be supported on the partition wall 113.

The cooling plate 130 may include a cooling passage 142 in which a refrigerant may flow to cool the plurality of battery cells 210. The cooling plate 130 may have a structure covering the lower surfaces 212 of the plurality of battery cells 210. The cell assembly 200 may exchange heat with the cooling plate 130 in a state in which at least a portion of the lower surfaces 212 of the plurality of battery cells 210 are exposed. Accordingly, heat exchange between the lower surface 212 of the battery cell 210 and the cooling plate 130 may be smoothly performed. Also, a heat transfer member 150 may be interposed between the cell assembly 200 and the cooling plate 130 to increase heat transfer efficiency.

The cell assembly 200 may include a gas outlet 253 in a portion opposite to the electrode terminal (211 in FIG. 4) of the battery cell 210 to discharge high-temperature gas or flame discharged from the battery cell 210 to the outside of the cell assembly 200. At least one of the plurality of sidewalls 112 may include a first communication hole 112*a* formed in a portion opposing the gas outlet, and a first gas channel 112*b* formed in the at least one sidewall 112 to be connected to the first communication hole 112*a*. Accordingly, high-temperature gas and flame generated in the battery cell 210 may flow into the first communication hole 112*a* through the gas outlet 253 and may flow through the first gas channel 112*b*. The intensity of the flame flowing through the first gas channel 112*b* may be weakened while flowing through the first gas channel 112*b*, and may reduce the amount of flame discharged to the outside of the housing (110 in FIG. 1). Also, the high-temperature gas flowing through the first gas channel 112*b* may be discharged to the outside of the housing (110 in FIG. 1) while the temperature is lowered while flowing through the first gas channel 112*b*.

Also, at least one of the plurality of partition walls 113 may include a second communication hole 113*b* formed in a portion opposite to the gas outlet, and a second gas channel 113*c* formed in the at least one partition wall 113 to be connected to the second communication hole 113*b*. Accordingly, the gas generated in the battery cell 210 may flow into the second communication hole 113*b* through the gas outlet 253 and may flow through the second gas channel 113*c*. The temperature of flame flowing through the second gas channel 113*c* may be lowered or the intensity of flame thereof may be weakened while flowing through the second gas channel 113*c*, and accordingly the amount of flame discharged to the outside of the housing (110 in FIG. 1) may be reduced. Also, high-temperature gas flowing through the first gas channel 112*b* may be discharged to the outside of the housing (110 in FIG. 1) while the temperature thereof is lowered while flowing through the first gas channel 112*b*.

High-temperature gas or flame generated in the cell assemblies 200 may flow through the first gas channel 112*b* of the sidewall 112 or the second gas channel 113*c* of the partition wall 113, such that the flow of high-temperature gas or flame generated in a portion of cell assemblies 200 to other cell assemblies 200 may be reduced or prevented. Accordingly, a phenomenon in which other cell assemblies 200 are sequentially ignited by high-temperature gas or flame may be reduced or delayed.

Each of the cell assemblies 200 may be electrically connected by an external busbar 170, and the external busbar 170 may be electrically connected to an electrical component (160 in FIG. 1) such as a battery management system (BMS). Since the configuration of the external busbar 170 electrically connecting the cell assemblies 200 is known, a detailed description thereof will not be provided.

Figure 12:
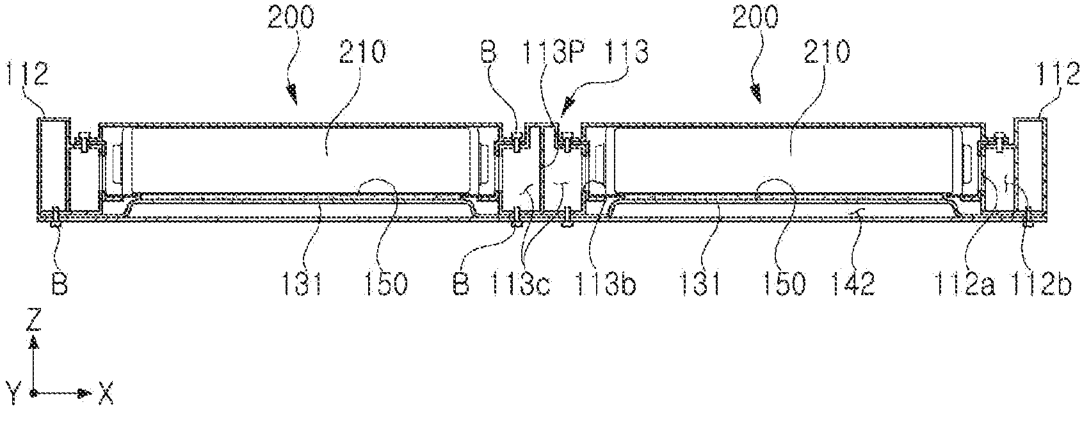
FIG. 12 is a cross-sectional diagram illustrating a modified example taken along line IV-IV' in FIG. 1.

FIG. 12 is a cross-sectional diagram illustrating a modified example taken along line IV-IV' in FIG. 1.

The example embodiment illustrated in FIG. 12 may be configured substantially the same as that of the example embodiment illustrated in FIG. 11, other than the configuration in which the blocking plate 113*p* is provided in the partition wall 113.

As illustrated in FIG. 12, at least one of the plurality of partition walls 113 may include a blocking plate 113*p* partitioning the second gas channel 113*c* in the length direction. The blocking plate 113*p* may partition a region in which gas generated from the cell assembly 200 disposed on the first side (e.g., the left side in FIG. 12) of each partition wall 113 flows, and a region in which gas generated from the cell assembly 200 disposed on the second side opposite to the first side (e.g., the right side of FIG. 12) flows. That is, the blocking plate 113*p* may partition a path through which high-temperature gas or flame introduced from the cell assembly 200 disposed on the first side of the partition wall 113 through the second communication hole 113*b* flows, and a path through which high-temperature gas or flame flowing from the cell assembly 200 disposed on the second side of the partition wall 113 through the second communication hole 113*b* flows. By providing a blocking plate 113*p* in the partition wall 113, the flow of high-temperature gas or flame flowing in through the second communication hole 113*b* disposed on one of sides of the partition wall 113 to other cell assemblies 200 may be prevented and reduced.

In the description below, operational effects in the example embodiment will be described with reference to FIGS. 13A and 13B.

Figure 13A:
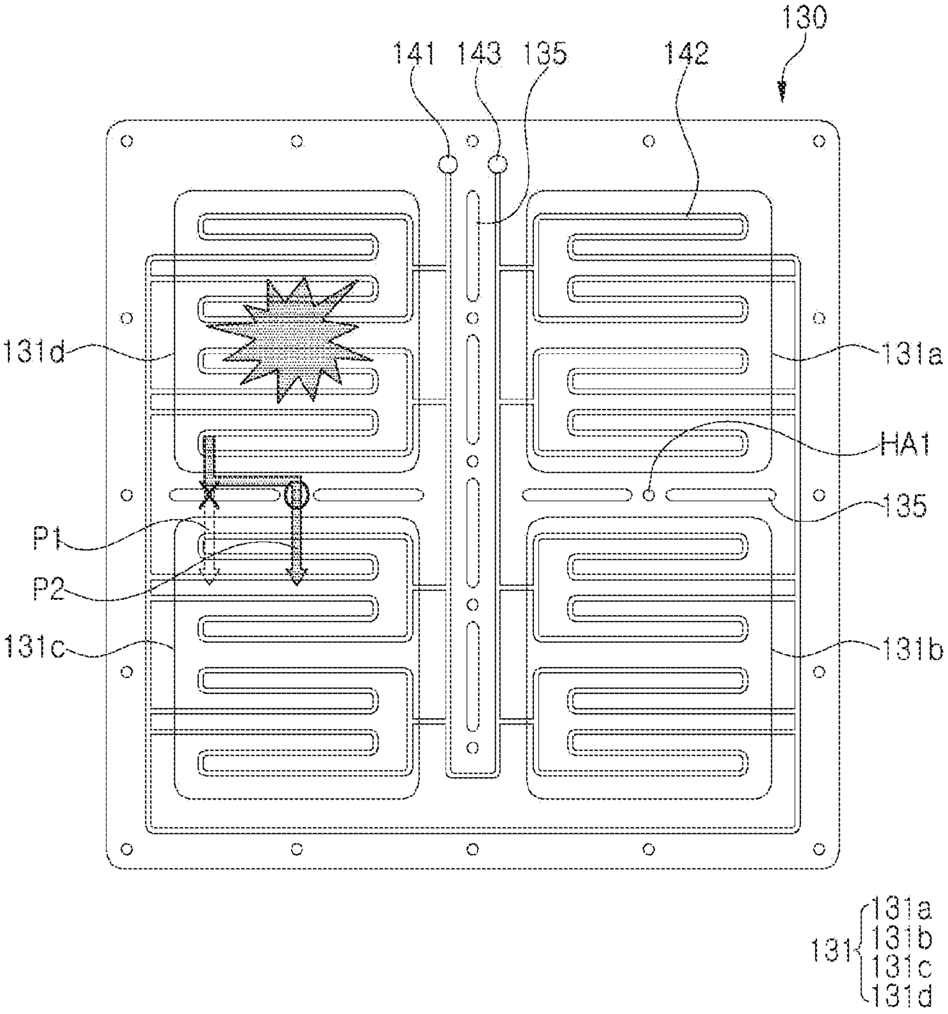
FIG. 13A is a diagram illustrating a heat flow in a battery device according to an example embodiment of the present disclosure.

FIG. 13A is a diagram illustrating a heat flow in a battery device (100 in FIG. 1) according to an example embodiment. FIG. 13B is a diagram illustrating a heat flow in a battery device 100 according to a comparative example. FIGS. 13A and 13B do not include the housing (110 in FIG. 1) and the cell assembly (200 in FIG. 1).

Referring to FIG. 13A, the battery device 100 according to the example embodiment may include a plurality of seating portions 131 on which the cell assembly 200 is seated. For example, when the temperature of the cell assembly 200 seated on the fourth seating portion 131*d* increases rapidly due to an event, heat of the cell assembly 200 may be transferred to the fourth seating portion 131*d* of the cooling plate 130. In this case, since the fourth seating portion 131*d* is partitioned from the adjacent first seating portion 131*a* or third seating portion 131*c* by the heat transfer delay portion 135, as indicated by arrow P1, heat transfer from the fourth seating portion 131*d* to the first seating portion 131*a* or the third seating portion 131*c* may be delayed. That is, high-temperature heat of the fourth seating portion 131*d* may be difficult to be easily transferred to the first seating portion 131*a* or the third seating portion 131*c* through the heat transfer delay portion 135, and as indicated by arrow P2, high-temperature heat may be transferred to the first seating portion 131*a* or the third seating portion 131*c* only through the fastening portion HA1 in which the heat transfer delay portion 135 is not disposed. As described above, transfer of high-temperature heat generated from a portion of the cell assembly 200 to another adjacent cell assembly 200 through the cooling plate 130 may be reduced or delayed. Accordingly, a phenomenon in which other cell assemblies 200 are ignited due to high-temperature heat generated in a portion of the cell assemblies 200 may be reduced or delayed.

Figure 13B:
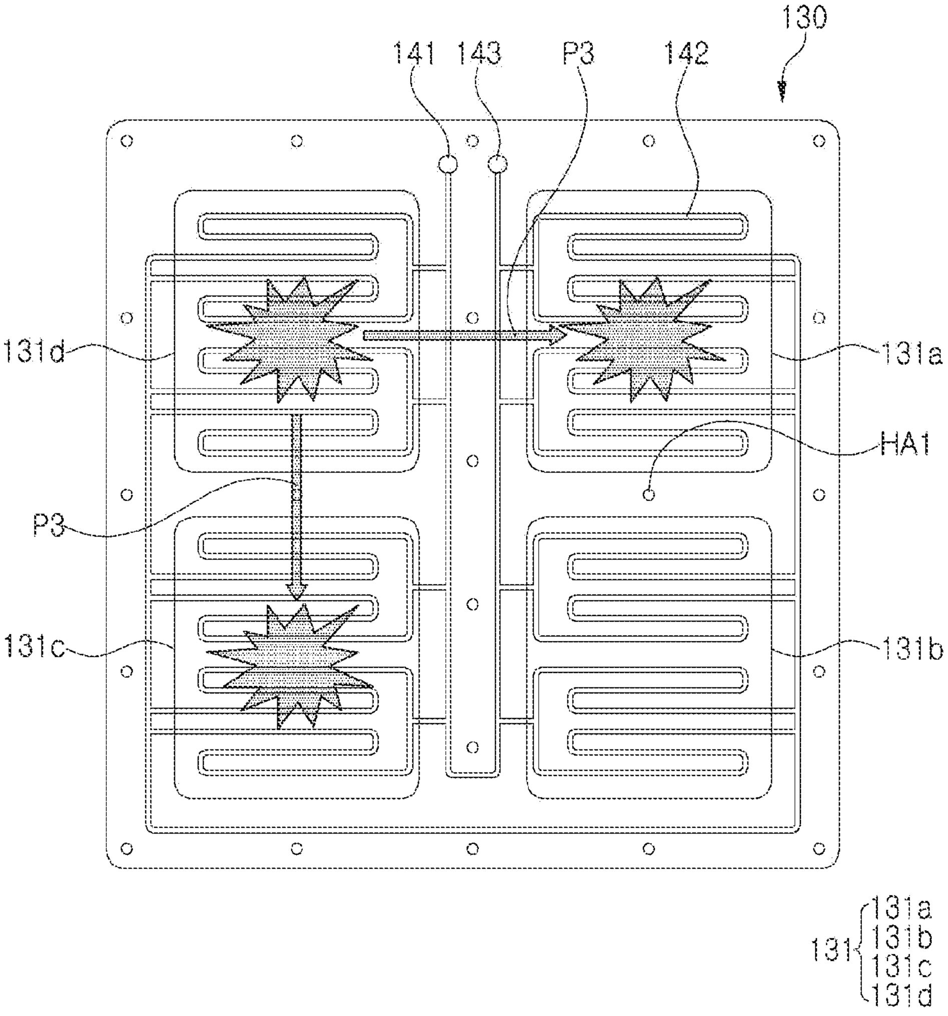
FIG. 13B is a diagram illustrating a heat flow in a battery device according to a comparative example.

In FIG. 13B, in the comparative example, the heat transfer delay portion 135 may not be disposed, and accordingly, as indicated by arrow P3, heat generated in the cell assembly 200 seated on one seating portion 131 may be easily transferred to another adjacent seating portion 131 through the cooling plate 130. Accordingly, in the comparative example, high-temperature heat generated from a portion of the cell assemblies 200 may be easily transferred to other adjacent cell assemblies 200 through the cooling plate 130, such that the ignition of other cell assemblies 200 may not be reduced or delayed.

According to the aforementioned example embodiments, by reducing or delaying the transfer of high-temperature heat generated from a portion of the cell assemblies to other adjacent cell assemblies through the cooling plate, the effect of reducing or delaying the ignition of other cell assemblies may be obtained.

Also, by forming a gas discharge path to prevent or reduce the flow of high-temperature gas or flame generated in a portion of cell assemblies to other cell assemblies, the effect of reducing or delaying chain ignition of other cell assemblies by high-temperature gas or flame may be obtained.

Also, the effect of delaying or reducing secondary ignition and/or thermal runaway of a battery cell may be obtained.

While the example embodiments have been illustrated and described above, it will be apparent to those skilled in the art that modifications and variations could be made without departing from the scope of the present disclosure as defined by the appended claims.

For example, it may be implemented by deleting some components in the above-described embodiments, and each of the embodiments and modified examples may be implemented in combination with each other.

What is claimed is:

1. A battery device, comprising:

a plurality of cell assemblies each including a plurality of battery cells;

a housing including an accommodation space in which the plurality of cell assemblies are accommodated; and a cooling plate installed inside the housing to cool the plurality of cell assemblies, wherein the cooling plate includes a plurality of seating portions on which the cell assemblies are seated, respectively, and a heat transfer delay portion disposed between the plurality of seating portions and preventing or reducing heat transfer between the seating portions adjacent to each other, wherein the cooling plate has a structure that is coupled to a lower side of the housing to cover an open portion of the lower side of the housing, and wherein the heat transfer delay portion includes at least one opening provided in the cooling plate.

2. The battery device of claim 1, wherein the heat transfer delay portion is disposed in a direction intersecting a region between the plurality of seating portions adjacent to each other.

3. The battery device of claim 2, wherein a width of the heat transfer delay portion disposed between seating portions adjacent to each other has a value of ½ or more of an opposing width of the seating portions adjacent to each other.

4. The battery device of claim 1, wherein the cooling plate includes a cooling passage through which a refrigerant flows, and wherein the heat transfer delay portion is disposed in a region of the cooling plate in which the cooling passage is not disposed.

5. The battery device of claim 1, wherein the heat transfer delay portion further includes a filler filled in the at least one opening to block heat transfer.

6. The battery device of claim 5, wherein the filler includes at least one of mica, silica, kaolin, silicate, graphite, alumina, ceramic wool, and aerogel.

7. The battery device of claim 1, wherein the cooling plate includes a first plate opposing the cell assembly and a second plate coupled to the first plate on an opposite side opposing the cell assembly, and wherein the cooling passage is formed between the first plate and the second plate.

8. The battery device of claim 7, wherein the at least one opening is formed on one of the first plate and the second plate, and wherein the other of the first plate and the second plate has a shape covering the at least one opening.

9. The battery device of claim 7, wherein the at least one opening is formed by penetrating through the first plate and the second plate.

10. The battery device of claim 1, wherein the housing includes a first housing forming the accommodation space and a second housing disposed on an upper side of the first housing to cover an upper portion of the accommodation space, and wherein the cooling plate is disposed on a lower side of the first housing to cover a lower portion of the accommodation space.

11. The battery device of claim 10, wherein the first housing includes a sidewall forming an edge of the housing and a partition wall intersecting the accommodation space to divide the accommodation space into a plurality of spaces in which the cell assemblies are accommodated, respectively, and wherein the sidewall and the partition wall are fastened to the cooling plate.

12. The battery device of claim 11, wherein the cooling plate includes a fastening portion fastened to the partition wall, and wherein the heat transfer delay portion has a shape disconnected from a region in which the fastening portion is formed.

13. The battery device of claim 1, wherein the cell assembly includes a casing in which the plurality of battery cells are accommodated, wherein the casing is configured to cover the plurality of battery cells in a state in which at least a portion of the lower surfaces of the plurality of battery cells is exposed, and wherein the cooling plate is configured to cover lower surfaces of the plurality of battery cells to cool the plurality of battery cells.

14. The battery device of claim 13, wherein a heat transfer member transferring heat generated from the plurality of battery cells to the cooling plate is disposed between a lower surface of the plurality of battery cells and an upper surface of the cooling plate.

15. The battery device of claim 1, wherein the cell assembly includes a casing in which a plurality of battery cells are accommodated, and wherein the casing has a gas outlet formed in a portion opposing an electrode terminal of the battery cell.

16. The battery device of claim 15, wherein the housing includes a plurality of sidewalls forming an edge of the housing to form the accommodation space, and wherein at least one of the plurality of sidewalls includes a first communication hole formed in a portion opposing the gas outlet, and a first gas channel formed in the at least one sidewall to be connected to the first communication hole.

17. The battery device of claim 16, wherein the housing includes a plurality of partition walls intersecting the accommodation space to divide the accommodation space into a plurality of spaces in which the cell assemblies are accommodated, respectively, and wherein at least one of the plurality of partition walls includes a second communication hole formed in a portion opposite to the gas outlet, and a second gas channel formed in the at least one partition wall to be connected to the second communication hole.

18. The battery device of claim 17, wherein at least one of the plurality of partition walls includes a blocking plate partitioning the second gas channel in a length direction, and wherein the blocking plate partitions a region through which gas generated from a cell assembly disposed on a first side of each partition wall flows, and a region in which gas generated from the cell assembly disposed on a second side opposite to the first side flows.

19. A battery device, comprising:

a plurality of cell assemblies each including a plurality of battery cells;

a housing including sidewalls forming an accommodation space in which the plurality of cell assemblies are accommodated, and a plurality of partition walls intersecting the accommodation space to divide the accommodation space into a plurality of spaces in which the cell assemblies are accommodated, respectively; and a cooling plate installed inside the housing, covering a lower portion of the accommodation space, and fixed to the sidewall and the partition wall to cool the plurality of cell assemblies, wherein the plurality of cell assembly includes a casing configured to cover the plurality of battery cells in a state in which at least a portion of lower surfaces of the plurality of battery cells are exposed, and wherein the cooling plate includes a plurality of seating portions on which lower surfaces of the cell assemblies are seated, respectively, and a heat transfer delay portion disposed below the partition wall and preventing or reducing heat transfer between the seating portions adjacent to each other, wherein the cooling plate has a structure that is coupled to a lower side of the housing to cover an open portion of the lower side of the housing, and wherein the heat transfer delay portion includes at least one opening provided in the cooling plate.

* * * * *